April 27, 1943.   R. E. BURK   2,317,951
FRACTIONAL DISTILLATION MEANS
Filed Oct. 18, 1940

INVENTOR.
ROBERT E. BURK
BY Oberlin, Limbach & Day
ATTORNEYS.

Patented Apr. 27, 1943

2,317,951

UNITED STATES PATENT OFFICE 2,317,951

FRACTIONAL DISTILLATION MEANS

Robert E. Burk, Cleveland Heights, Ohio, assignor to The Standard Oil Company, Cleveland, Ohio, a corporation of Ohio Application October 18, 1940, Serial No. 361,706

5 Claims. (Cl. 261—112)

This invention relates to apparatus involving liquid and gasiform contact, particularly as in fractional distillation, and procedure involving operation thereof; and it is among the objects of the invention to provide improved contact, with resultant efficiency of molecular relation, and especially close separation of fractions where operating fractional distillation.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Figure 1:
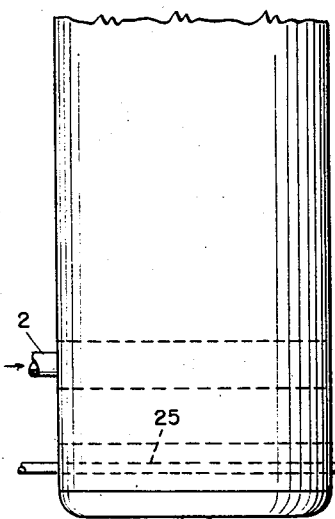
Figure 2:
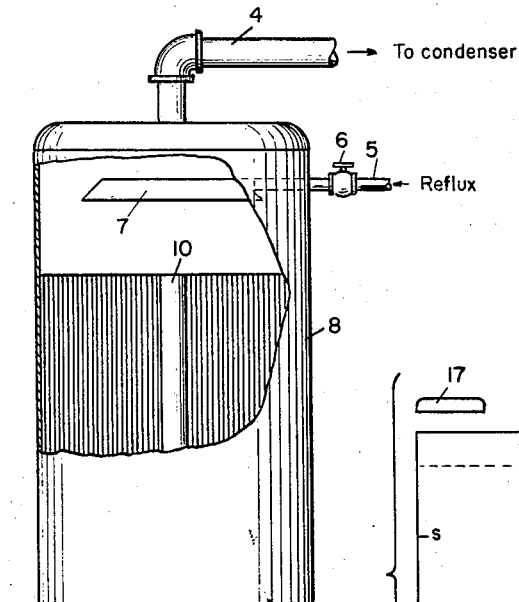
Figure 2:
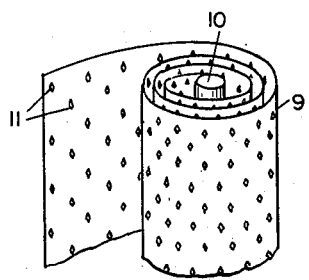
Figure 4:
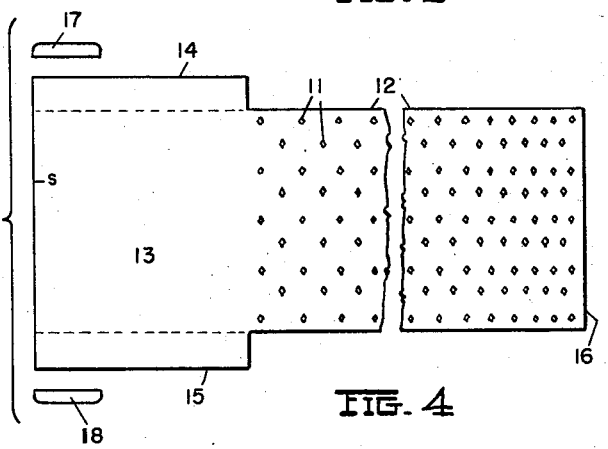
Figure 5:
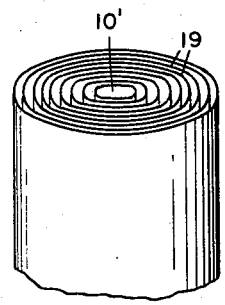
Figure 6:
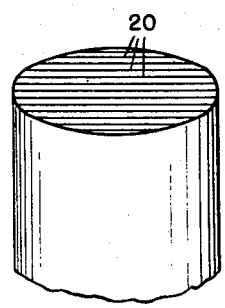
Figure 3:
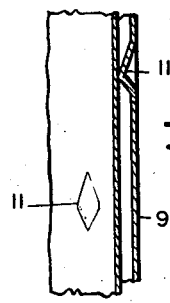

In said annexed drawing:

Fig. 1 is a side elevational view, partly broken away, showing an embodiment of the invention; Fig. 2 is a fragmentary detail perspective view of a portion of interior construction; Fig. 3 is an enlarged fragmentary sectional detail; Fig. 4 is a plan view of a blank prior to its being assembled to form a complete device; and Figs. 5 and 6 are fragmentary perspective views showing modifications.

In fractional distillation, and in fact in liquid and gasiform contact generally, different sets of molecules are brought into contact, and for fractionation a separation of the molecules in accordance with their range of complexity is sought. Ideally, all of the molecules of one structure should be separated from those of the other component or components of the mixture, the boiling points corresponding to the structures. This ideal precision of separation has not been realized in such extent in practice. A particularly favored form of apparatus is a bell cap plate column in which ascending vapors bubble through a layer of condensate liquid on each plate in succession. The extent of effectiveness of contact here depends upon the number of plates especially, and even with the extreme number of plates feasible in practice, much of the molecular mass proceeds through without adequate contact and interchange at vapor-liquid surfaces. Less satisfactory constructions are columns having fillings providing a multitude of spaces and surfaces in various directions but permitting general through-pass of vapors. Such constructions are not capable of desirable precision, and are also subject to blockage and channeling, etc. I have found that a source of difficulty with filled columns or towers generally is the failure to provide the right quality of contact and properly uniform surface contact between vapor and liquid. Where molecules are in a given zone of temperature, and molecules in vapor state are near their condensation point or molecules in liquid state are near their vaporizing point, very little disturbance suffices to considerably influence the trend of molecular action. A defect heretofore has been the non-uniformity of surface exposure, there being breaks in continuity to induce slight irregular turbulences and interference with pure interchange and change of state in accordance with boiling points. Ideally, the molecules in gasiform or in vapor state should be presented in interchange relation in very thin layer form in moving contact with the liquid molecules in film a few molecules thick, and there should be uniformity of such thickness and freedom from irregularities and breaks. In accordance with the present invention, the vapor and liquid are contacted in such manner that the vapor, traveling upwardly, is in thinnest practicable layer and continuity, and the liquid reflux or condensate formed travels counter-currently thereto in particularly thin and uniform continuous film.

In its general aspects the liquid and gasiform contact contemplated is thus provided on surfaces sufficiently pitched for free drainage, and avoidance of liquid pools and bubbles; and the surfaces to accomplish this may vary in detail form, such as involving vertical cellular compartments with various forms of bounding surfaces as desired, having free run-off. As illustrated in Fig. 1, thus a fractionating column is provided having an inlet 2 for materials to be fractionated, a valve-controlled drain-line 3 for removal of residual liquid and a connection by a vapor off-take 4 at its upper portion to a condenser system which may be of any preferred or desirable form, and which desirably includes provision for a return of reflux liquid, as by connection 5 with a control-valve 6. The reflux liquid may be distributed by any suitable means, such as a spray-head 7 whose detail may be of any usual or preferred form. Beneath the reflux distributor is the fractionating body which involves multiple narrow ascending vapor spaces whose walls provide substantially smooth continuous surfaces for thin films of descending liquid. The whole is enclosed by the outer shell 8. In detail, this fractionating body, in the form shown in Fig. 2 may be a closely wound spiral of sheet metal 9, the turns being in uniform spacing such as to allow down-flow of separate liquid films, without blockage and filling of the spaces, and providing uniform draft for vapors across the section of the body. One or more such sections may be employed. Usually a stripping section at the bottom below the inlet 2 is desirable. The sheet metal may be of light or heavier gauge, depending upon the size of the unit, and I prefer to maintain the spacing by pressed dents or blisters 11 of suitable uniformity in the sheet metal. The distance between the sheet metal turns in place for operation is quite close, for instance one and one-half millimeters, or in some cases one millimeter. The blisters or dents 11 are preferably stream-lined or shaped such as to promote smooth continuous down-flow of liquid, as opposed to drop-accumulation as prevalent in filling heretofore. In some cases knife-edge spacing elements may be employed. The material of the sheet stock may be as desired in any particular instance, depending upon the duty contemplated. With non-corroding liquids and gasiform agents, the sheet stock may be for instance an ordinary metal such as sheet steel, iron, copper, brass, zinc, etc. With liquids etc. prone to cause corrosion, stainless steel, high chromium steels, nickel, monel, etc., may be employed.

For highest accuracy, the spacing means or dents may be located in progressive distance from each other depending upon the distance which a particular part of the sheet will have from the center when assembled, and thus in arranging the spacing elements in sheet stock to be wound up spirally, such elements or dents may be at progressively lessened distance from one end of the sheet to the other. For many uses such refinement of spacer distance compensation is not necessary.

Where the sheet stock is rolled into a spiral, a center core 10, which may be a tube closed at both ends, is employed. As completely rolled up in such assembly then, the unit may be set into place in a container or shell providing a space for residual liquid below and the vapor head space above as already indicated. As a further refinement however, the fractionating body and the shell may be made up together. Thus, as illustrated in Fig. 4, a sheet metal blank of sufficient length for the fractionator desired, has its body portion 12 in which the dents or spacing-blisters are pressed, and the portion 13 in extension is free from such dents and has projecting ends 14, 15, the dimension of the portion 13 being such that when the sheet is rolled up starting at the end 16 on the center core, the portion 13 finally envelops the wound-up roll and its free edge s is then secured or seamed, as by welding, or for smaller units by soldering, etc., closing the exterior into a shell containing the fractionating body. The portions 14 and 15 projecting above and below the fractionating body form the top and bottom spaces for vapor and residual liquid, respectively, and may be closed in turn therefor by securing thereto heads 17, 18, which for convenience may be of sheet stock, and may be of convex or bumped form as desired, and may be welded or in smaller units soldered with tight closure seams.

In some cases, less desirably, a plurality of concentric sheet metal cylinders, Fig. 5, may be assembled to form a unit, spacing being provided as above-described by spacer elements fastened to one surface or preferably by indents. The outside cylinder may constitute the shell or housing. A center closed-off tube 10′ can be provided. Instead of concentric cylinders, for some uses flat plates 20, Fig. 6, of suitable dimensions to make up the body unit and spaced apart with the narrow spacing as described above can be set in place as chordal sheets in the shell or housing 21. The relationship of upper gasiform or vapor space in the lower residual liquid space remains as above-described.

Apparatus in accordance with the invention can be of rugged or lighter construction and in large or small size as may be desired, in any instance, and may be employed at atmospheric pressure, or under higher pressure, or under vacuum, according to particular requirements.

In the practice of fractionation, the material to be fractionated is supplied through the feed pipe 2, and depending upon the particular materials and conditions concerned, such feed may be wholly a vapor as coming from a suitable vaporizer, or mixed vapor and liquid as in some cases. Additional heat, as desired at the bottom, may be had by heating means 25, such as a steam coil. The vapors proceed up through the multiple narrow passways between the sheet surfaces, and with progressive temperature decline from bottom to top, condensate forming on the surfaces, together with reflux proceeding from above, is exposed to the vapor flow, and progressive exchange and separation in accordance with inherent boiling points proceeds. Reflux may be provided through the reflux pipe 5, as controlled by valve 6. The rate of vapor feed is controlled to distillation rate as desired for the particular material being distilled, and with suitably controlled low distillation rates efficiencies as high as sixty theoretical plates per foot of height may readily be attained; there being very great thinness and uniformity of the liquid film which the free drainage makes possible. And the continuity of surface, as opposed to the customary breaks and dissimilar surfaces in apparatus heretofore, increases the uniformity of conditions to which molecules near their critical point of change of state are subjected; and the usual tendencies toward mass movement of dissimilar molecules, and too much entrainment, are correspondingly obviated. With mixtures having quite widely separated boiling point constituents a very high throughput rate can be maintained in proportion to the size of the unit, beccause of its efficiency and uniformity of action. Again, where mixtures fractionated are very close in boiling points, by suitable control of the distillation rate extremely sharp separation may be obtained. Separation of alcohols from water, or separation of aromatic hydrocarbons from aliphatic hydrocarbons, or separation of closely gradated hydrocarbons may thus be carried out as desired.

In some cases contact of liquid and gasiform molecules may be greatly promoted by a wetting agent, non-volatilizing, provided in small amount in the liquid, as for instance alkali metal salts of mono-esters of sulphuric acid, sulphonates or sulphonic acids, soaps, sulphur compounds, etc. Particularly thin liquid films thereby result, and effective flow of liquids may be assured without change of their heat content.

This application is a continuation, in part, and as to common subject matter, of my application Serial No. 283,234, filed July 7, 1939.

Other modes of applying the principle of the invention may be employed, change being made as regards the details described, provided the features stated in any of the following claims, or the equivalent of such, be employed.

I therefore particularly point out and distinctly claim as my invention:

1. Apparatus of the character described, which comprises a unit having multiple unobstructed narrow ascending vapor passways with walls providing smooth continuous free drainage of liquid in film and formed by closely spaced sheet stock with spacing means inhibiting entrainment of liquid, said means comprising pressed spacing dents stream-lined in the direction of liquid flow, such passways being open below to a space for an input and open above to a space for off-take.

2. Fractional distillation apparatus, comprising multiple unobstructed narrow ascending vapor passways formed by a close spaced spiral wound sheet, an outside container consisting of the exterior end of said spiral sheet wrapped around and seamed to form a closing shell for the whole with a liquid-receiving space below and a vapor space at the top, heads closing said spaces, and a feed inlet connection and a drain for such lower space, and a vapor off-take connection for such top space.

3. Fractional distillation apparatus, comprising multiple unobstructed narrow ascending vapor passways formed by closely spaced sheet stock, an outside container consisting of a portion of said sheet stock wrapped around to form also the enclosing shell for the whole, such passways being open below to a space for an input and open above to a space for vapor off-take.

4. Apparatus of the character described, which comprises a unit having multiple unobstructed narrow ascending vapor passways with walls providing smooth continuous free drainage of liquid in film and formed by closely spaced curved sheet stock in layer-wise arrangement from center outwardly and with spacing elements at progressive distance from each other along the sheet stock in accordance with the distance from the center of the assembly whereby the dents are closest where the curvature has the smallest radius.

5. Apparatus of the character described, which comprises a unit having multiple unobstructed narrow ascending vapor passways with walls providing smooth continuous free drainage of liquid in film and formed by closely spaced sheet stock with spacing means inhibiting entrainment of liquid, said means comprising pressed streamlined spacing dents.

ROBERT E. BURK.